(12) United States Patent
Morinaga

(10) Patent No.: US 8,625,954 B2
(45) Date of Patent: Jan. 7, 2014

(54) TRANSMISSION SYSTEM, RECORDING APPARATUS, TRANSMISSION METHOD, RECORDING METHOD AND PROGRAM

(75) Inventor: Takeo Morinaga, Kanagawa (JP)

(73) Assignee: Sony Corporation (JP)

(*) Notice: Subject to any disclaimer, the term of this patent is extended or adjusted under 35 U.S.C. 154(b) by 1400 days.

(21) Appl. No.: 12/151,553

(22) Filed: May 7, 2008

(65) Prior Publication Data

US 2008/0292274 A1 Nov. 27, 2008

(30) Foreign Application Priority Data

May 23, 2007 (JP) ................. P2007-136686

(51) Int. Cl.
*H04L 29/06* (2006.01)

(52) U.S. Cl.
USPC ................. 386/46; 386/69; 386/343

(58) Field of Classification Search
USPC ................. 386/46, 69, 343
See application file for complete search history.

(56) References Cited

U.S. PATENT DOCUMENTS

| 6,002,834 | A | 12/1999 | Hirabayashi et al. |
| 6,628,890 | B1 | 9/2003 | Yamamoto et al. |
| 2002/0018643 | A1 | 2/2002 | Okada et al. |
| 2002/0061181 | A1 | 5/2002 | Honjo |
| 2004/0213552 | A1* | 10/2004 | Kato ............... 386/69 |
| 2008/0219393 | A1* | 9/2008 | Toma et al. ........ 375/E07.243 |

FOREIGN PATENT DOCUMENTS

| EP | 1150497 | 10/2001 |
| JP | 06267196 A | 9/1994 |
| JP | 2000331421 A | 11/2000 |
| JP | 2001024994 A | 1/2001 |
| JP | 2002016919 A | 1/2002 |
| JP | 2002-290917 A | 10/2002 |
| JP | 2002-369149 A | 12/2002 |
| JP | 2003339019 A | 11/2003 |
| JP | 2004194215 A | 7/2004 |
| JP | 2005197839 A | 7/2005 |
| JP | 2005268946 A | 9/2005 |
| WO | 01/35669 A1 | 5/2001 |
| WO | 2006/034464 A1 | 3/2006 |

OTHER PUBLICATIONS

European Search Report issued on Sep. 15, 2008 in connection with corresponding European Patent Application No. EP 08 15 6782.
Office Action from Japanese Application No. 2007-136686, dated Sep. 27, 2011.
Office Action from Japanese Application No. 2007-136686, dated Jul. 24, 2012.

* cited by examiner

*Primary Examiner* — Jeffrey Pwu
*Assistant Examiner* — Thong Truong
(74) *Attorney, Agent, or Firm* — Lerner, David, Littenberg, Krumholz & Mentlik, LLP

(57) ABSTRACT

A transmission system including a first recording apparatus and a second recording apparatus connected to each other through a network is disclosed. The first recording apparatus includes a recording means for recording an AV stream, a generating means for analyzing picture types of respective pictures and generating trick play information, and a transmission means for transmitting the AV stream to the second recording apparatus with the time information. The second recording apparatus includes a receiving means for receiving the AV stream and the time information, and a recording control means for recording the AV stream on a predetermined recording medium as well as recording trick play information including recording positions of I-pictures included in the AV stream on the predetermined recording medium and time information indicating the time of respective I-pictures on the AV stream, which is generated based on the time information, on the predetermined recording medium.

7 Claims, 13 Drawing Sheets

FIG. 4

| PTS 1 | I-PICTURE RECORDING POSITION 1 |
|---|---|
| PTS 2 | I-PICTURE RECORDING POSITION 2 |
| PTS 3 | I-PICTURE RECORDING POSITION 3 |
| ⋮ | ⋮ |
| PTS x | I-PICTURE RECORDING POSITION x |
| PTS x+1 | I-PICTURE RECORDING POSITION x+1 |

FIG. 10

TRICK PLAY INFORMATION

| PTS | RECORDING POSITION |
|---|---|
| PTS #1 ⋮ | RECORDING POSITION OF I-PICTURE #1 ⋮ |

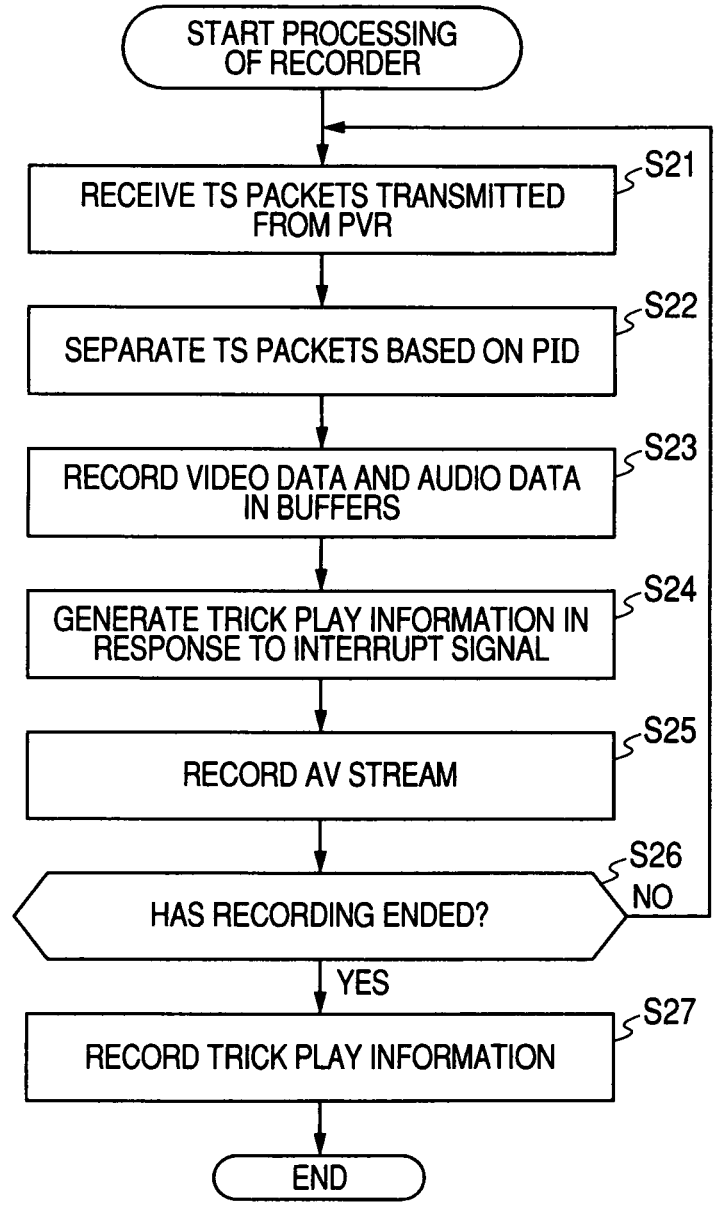

TRANSMISSION SYSTEM, RECORDING APPARATUS, TRANSMISSION METHOD, RECORDING METHOD AND PROGRAM

CROSS-REFERENCE TO RELATED APPLICATIONS

The present application claims priority from Japanese Patent Application No. JP 2007-136686, filed in the Japanese Patent Office on May 23, 2007, the entire content of which is incorporated herein by reference.

BACKGROUND OF THE INVENTION

1. Field of the Invention

The invention relates to a transmission system, a recording apparatus, a transmission method, a recording method and a program, and particularly relates to a transmission system, a recording apparatus, a transmission method, a recording method and a program capable of efficiently recording contents transmitted from another apparatus with information used for trick play thereof.

2. Description of the Related Art

Recording apparatuses such as a DVD (Digital Versatile Disc) recorder and a Blu-ray (Registered Trademark) recorder are becoming popular. A user can record a content broadcasted by digital broadcasting and the like in an internal hard disc, and can view the content later.

When the user views the content recorded in the hard disc, the user can also perform it by trick play. The trick play includes various playback methods other than normal speed playback in forward direction such as fast-forwarding, rewinding, and head searching of a content during playback.

In order to realize various kinds of playback methods, trick play information which is information used for the trick play of the content is recorded with the content when recording the content in the recording apparatus. When the recording system is a MPEG (Moving Picture Experts Group) system, the trick play information includes PTS (Presentation Time Stamp) indicating the time of each I-picture on the content.

The trick play information will be explained here.

The recording of contents in the MPEG system is performed in the unit of GOP (Group Of Picture), in which one GOP includes the prescribed number of pictures of three types of pictures which are I-picture, P-picture and B-picture.

I-picture is a picture which is intra-coded not referring to other pictures. P-picture is a picture which is prediction-coded by referring I-picture or P-picture previously displayed in a temporal scale and by using a prediction picture generated from the picture to be referred. B-picture is a picture which is prediction-coded by referring I-picture or P-picture previously displayed in a temporal scale and one or both of I-picture and P-picture later displayed in a temporal scale and by using a prediction picture generated from the picture to be referred.

The decoding (playback) processing is also performed in this order, and the picture later displayed in a temporal scale is referred, if necessary.

When respective pictures forming the GOP are shown by combinations of alphabets (I, P, B) indicating picture types and numbers indicating the order of display, in the case that 1 GOP is formed by pictures of 15 frames and I-picture or P-picture are arranged in the unit of three pictures, 1 GOP is shown as "B1, B2, I3, B4, B5, P6, B7, B8, P9, B10, B11, P12, B13, B14, and P15".

For example, since there is a case in which B-picture is encoded not only by referring the picture previously displayed in a temporal scale but also by referring the picture later displayed in a temporal scale, it is difficult to play back the B-picture when the picture later displayed is not played back.

Therefore, when playing back contents recorded in the MPEG system, the picture referred to for the playback of the B picture is played back before the B-picture. Accordingly, playback of the GOP formed by "B1, B2, I3, B4, B5, P6, B7, B8, P9, B10, B11, P12, B13, B14, and P15" and displayed in that order as described above will be played back in the order of "I3, B1, B2, P6, B4, B5, P9, B7, B8, P12, B10, B11, P15, B13, and B14".

That is, pictures B1, B2 in the certain GOP are played back by referring to a picture P15 which is picture previous for one picture and a picture I3 in the same GOP which is displayed later, and the picture I3 is played back without referring to other pictures.

Pictures B4, B5 are played back by referring to the picture I3 in the same GOP which is previously displayed and a picture P6 in the same GOP which is displayed later, and the picture P6 is played back by referring to the picture I3 in the same GOP which is previously displayed.

Pictures B7, B8 are played back by referring to the picture P6 in the same GOP which is previously displayed and a picture P9 in the same GOP which is displayed later, and the picture P9 is played back by referring to the picture P6 in the same GOP which is previously displayed.

Pictures B10, B11 are played back by referring to the picture P9 in the same GOP which is previously displayed and a picture P12 in the same GOP which is displayed later, and the picture P12 is played back by referring to the P9 in same GOP which is previously displayed.

Pictures B13, B14 are played back by referring to the picture P12 in the same GOP which is previously displayed and a picture P15 in the same GOP which is later displayed, and the picture P15 is played back by referring to P12 in the same GOP which is previously displayed.

Therefore, for example, when fast forwarding in the trick play is selected and the position of B5 is selected as a position of the fast-forwarding destination, it is necessary to play back the picture I3 in the same GOP which is previously displayed and the picture P6 in the same GOP which is displayed later in order to play back the picture B5, therefore, the playback of the GOP including the picture B5 designated as the position of the fast-forwarding destination is performed in the order of pictures "I3, P6, B5, P9, B7, B8, P12, B10, B11, P15, B13, and B14", as shown in an upper row of FIG. 1.

As shown in the lower row in FIG. 1, the display of video is performed from the picture B5 which is the picture designated as the position of the fast-forwarding destination in the order of pictures P6, B7, B8, P9, B10, B11, P12, B13, B14, and P15.

As described above, in order to display video from a certain position in the content according to the designation of the trick play, it is necessary to know the position (time) of an I-picture which is necessary to be played back before the picture of display start position is played back, therefore, PTS of each I-picture included in the content is recorded in the recording apparatus as trick play information when recording the content. The trick play information includes information indicating the number of the I-picture, recording positions of the I-picture on a recording medium and the like is also included in addition to the PTS.

The trick play is described in JP-A-2002-369149 (Patent Document 1).

SUMMARY OF THE INVENTION

In recent years, it is not unusual that one user uses plural recording apparatuses, and in such environment, contents are dealt with in such a matter that a content recorded in one recording apparatus is transmitted to another recording apparatus to be recorded in another recording apparatus.

Accordingly, the user can transmit the contents, for example, recorded in a STB (Set Top Box) including a hard disc to a DVD recorder or a Blu-Ray recorder including a hard disc to be played back in the recorder of a transmission destination, thereby viewing the content.

However, in the transmission of information between plural apparatuses, various arrangement have been made with respect to the transmission of contents, however, no arrangement has been made with respect to the transmission of trick play information. Therefore, if the recording apparatus of a transmission source creates trick play information and manages it, it is necessary that the recording apparatus of a transmission destination analyzes the transmitted content and creates trick play information by itself.

FIG. 2 is a view showing an example of a content transmission system of a related art.

The content transmission system of FIG. 2 is configured by a PVR (Personal Video Recorder) 1 and a recorder 2 being connected through a network 3 which is compliant with DLNA (Digital Living Network Alliance) or IEEE (Institute of Electrical and Electronics Engineers).

The PVR 1 is a STB including a hard disc, provided by a vendor providing contents by CS (Communication Satellite) broadcasting or cable television broadcasting. The recorder 2 is a recording apparatus such as a Blu-Ray recorder including a hard disc, which is purchased by the user at a sales outlet and the like.

As shown in FIG. 2, the PVR 1 includes a tuner 11, a recording control unit 12, a hard disc 13 and a transmission unit 14. The recorder 2 includes a receiving unit 21, a recording control unit 22 and a hard disc 23. An optical disc 24 such as a Blu-Ray disc is mounted in the recorder 2. In a format of the Blu-Ray disc, when a content is recorded, trick play information thereof is recorded with the content.

The tuner 11 of the PVR 1 receives and decodes a broadcast wave signal, acquiring a MPEG-TS (MPEG-Transport Stream). The tuner 11 acquires an AV stream of a content which is a subject to be recorded from the MPEG-TS, outputting the acquired AV stream to the recording control unit 12.

The recording control unit 12 records the AV stream supplied from the tuner 11 in the hard disc 13. The recording control unit 12 includes a stream analysis/trick play information generating unit 12A, analyzing the AV stream supplied from the tuner 11 to generate trick play information in the stream analysis/trick play information generating unit 12A.

For example, the stream analysis/trick play information generating unit 12A analyzes picture types of respective pictures forming the AV stream to acquire PTSs of I-pictures. The stream analysis/trick play information generating unit 12A generates trick play information by associating the acquired PTS with information indicating a recording position of the I-picture the time of which is shown by the PTS on the hard disc 13, and records the generated trick play information in the hard disc 13.

The hard disc 13 includes an AV stream area in which the AV stream is recorded and a trick play information area in which the trick play information is recorded. The AV stream in information supplied from the recording control unit 12 is recorded in the AV stream area and the trick play information is recorded in the trick play information area.

When the user instructs the transmission of a certain content to the recorder 2, the transmission unit 14 reads only the AV stream of the content to be transmitted, not reading trick play information of the content to be transmitted, and stores the read AV stream in plural TS packets to transmit it to the recorder 2 through the network 3.

The receiving unit 21 of the recorder 2 receives TS packets transmitted from the PVR 1, outputting the AV stream stored in the TS packets to the recording control unit 22.

The recording control unit 22 records the AV stream supplied from the receiving unit 21 in a recording medium designated as a recording destination, which is either the hard disc 23 or the optical disc 24. The recording control unit 22 includes a stream analysis/trick play information generating unit 22A, analyzing the AV stream supplied from the receiving unit 21 to generate trick play information in the stream analysis/trick play information generating unit 22A.

For example, the stream analysis/trick play information generating unit 22A analyzes picture types of respective pictures forming the AV stream to acquire the PTS of the I-picture. The stream analysis/trick play information generating unit 22A generates trick play information by associating the acquired PTS with information indicating a recording position of the I-picture the time of which is shown by the PTS on the recording medium, recording the generated trick play information in the hard disc 23 or the optical disc 24.

The hard disc 23 includes an AV stream area in which the AV stream is recorded and a trick play information area in which the trick play information is recorded. The AV stream in information supplied from the recording control unit 22 is recorded in the AV stream area and the trick play information is recorded in the trick play information area.

The optical disc 24 also records the AV stream supplied from the recording control unit 22 in the AV stream area and records the trick play information in the trick play information area.

Accordingly, when the content is transmitted from one apparatus to another apparatus, the AV stream is analyzed and trick play information is generated at both apparatuses of the transmission source and the transmission destination.

Therefore, it is ineffective because it is necessary to prepare a large-scaled hardware also at the apparatus of the transmission destination for generating trick play information or processing load in the apparatus of the transmission destination is heavy.

It is desirable to efficiently record contents transmitted from another apparatus with information used for trick play thereof.

According to an embodiment of the invention, there is provided a transmission system including a first recording apparatus and a second recording apparatus connected to each other through a network, in which the first recording apparatus includes a recording means for recording an AV stream, a generating means for analyzing picture types of respective pictures included in the AV stream and generating trick play information including time information indicating the time of I-pictures on the AV stream which are necessary to be played back before playing back a picture designated as a playback start position by trick play and a transmission means for transmitting the AV stream recorded in the recording means to the second recording apparatus with the time information included in the trick play information generated by the generating means.

The second recording apparatus includes a receiving means for receiving the AV stream and the time information transmitted from the first recording apparatus and a recording control means for recording the AV stream received by the receiving means on a predetermined recording medium as well as recording trick play information including recording positions of I-pictures included in the AV stream on the predetermined recording medium and time information indicating the time of respective I-pictures on the AV stream, which is generated based on the time information received by the receiving means, on the predetermined recording medium.

According to an embodiment of the invention, a recording apparatus connected to another recording apparatus through a network includes a recording means for recording an AV stream, a generating means for analyzing picture types of respective pictures included in the AV stream and generating trick play information including time information indicating the time of I-pictures on the AV stream which are necessary to be played back before playing back a picture designated as a playback start position by trick play and a transmission means for transmitting the AV stream recorded in the recording means to another recording apparatus with the time information included in the trick play information generated by the generating means.

The transmission means can insert a second packet storing the time information at a position just before a string of first packets storing data of the I-picture included in the AV stream and can transmit the string of first packets after transmitting the second packet.

The transmission means can transmit the first and second packets with different packet IDs being added respectively.

According to an embodiment of the invention, a transmission method or a program includes the steps of recording an AV stream, analyzing picture types of respective pictures included in the AV stream, generating trick play information including time information indicating the time of I-pictures on the AV stream which are necessary to be played back before playing back a picture designated as a playback start position by trick play and transmitting the AV stream to another recording apparatus with the time information included in the generated trick play information.

According to an embodiment of the invention, a recording apparatus connected through network to another apparatus, analyzing picture types of respective pictures included in an AV stream, generating trick play information including time information indicating the time of I-pictures on the AV stream which are necessary to be played back before playing back a picture designated as a playback start position by trick play, and transmitting the recorded AV stream with the time information included in the trick play information includes a receiving means for receiving the AV stream and the time information transmitted from another apparatus and a recording control means for recording the AV stream received by the receiving means on a predetermined recording medium as well as recording trick play information including recording positions of I-pictures included in the AV stream on the predetermined recording medium and time information indicating the time of respective I-pictures on the AV stream, which is generated based on the time information received by the receiving means, on the predetermined recording medium.

When a second packet storing the time information is inserted at a position just before a string of first packets storing data of the I-picture included in the AV stream, and the string of first packets is transmitted after the second packet is transmitted, the recording control means can generate trick play information by associating the time information stored in the second packet with a recording position of the I-picture on the predetermined recording medium, whose data is stored in the string of first packets transmitted just after the second packet.

According to an embodiment of the invention, a recording method or a program includes the steps of receiving the AV stream and the time information transmitted from another recording apparatus and recording the received AV stream on a predetermined recording medium as well as recording trick play information including recording positions of I-pictures included in the AV stream on the predetermined recording medium and time information indicating the time of respective I-pictures on the AV stream, which is generated based on the received time information, on the predetermined recording medium.

According to an embodiment of the invention, in the first recording apparatus, an AV stream is recorded, picture types of respective pictures included in the AV stream are analyzed, and trick play information including time information indicating the time of I-pictures on the AV stream which are necessary to be played back before playing back a picture designated as a playback start position by trick play is generated. The recorded AV stream is transmitted to the second recording apparatus with the time information included in the generated trick play information.

In the second recording apparatus, the AV stream and the time information transmitted from the first recording apparatus are received, and the received AV stream is recorded on a predetermined recording medium as well as trick play information including recording positions of I-pictures included in the AV stream on the predetermined recording medium and the time information indicating the time of respective I-pictures on the AV stream, which is generated based on the received time information, is recorded on the predetermined recording medium.

According to an embodiment of the invention, an AV stream is recorded, picture types of respective pictures included in the AV stream is analyzed and trick play information including time information indicating the time of I-pictures on the AV stream which are necessary to be played back before playing back a picture designated as a playback start position by trick play is generated. The AV stream is transmitted to another recording medium with the time information included in the generated trick play information.

According to an embodiment of the invention, an AV stream and time information transmitted from another recording apparatus are received, and the received AV stream is recorded on a predetermined recording medium as well as trick play information including recording positions of I-pictures included in the AV stream on the predetermined recording medium and time information indicating the time of the respective I-pictures on the AV stream, which is generated based on the received time information, is recorded on the predetermined recording medium.

According to embodiments of the invention, contents transmitted from another apparatus can be efficiently recorded with information used for trick play thereof.

BRIEF DESCRIPTION OF THE DRAWINGS

FIG. 4 is a chart showing an example of trick play information;

FIG. 10 is a view showing a specific example of processing by the recorder;

FIG. 13 is a flowchart explaining processing of the recorder.

DESCRIPTION OF THE PREFERRED EMBODIMENTS

Figure 1:
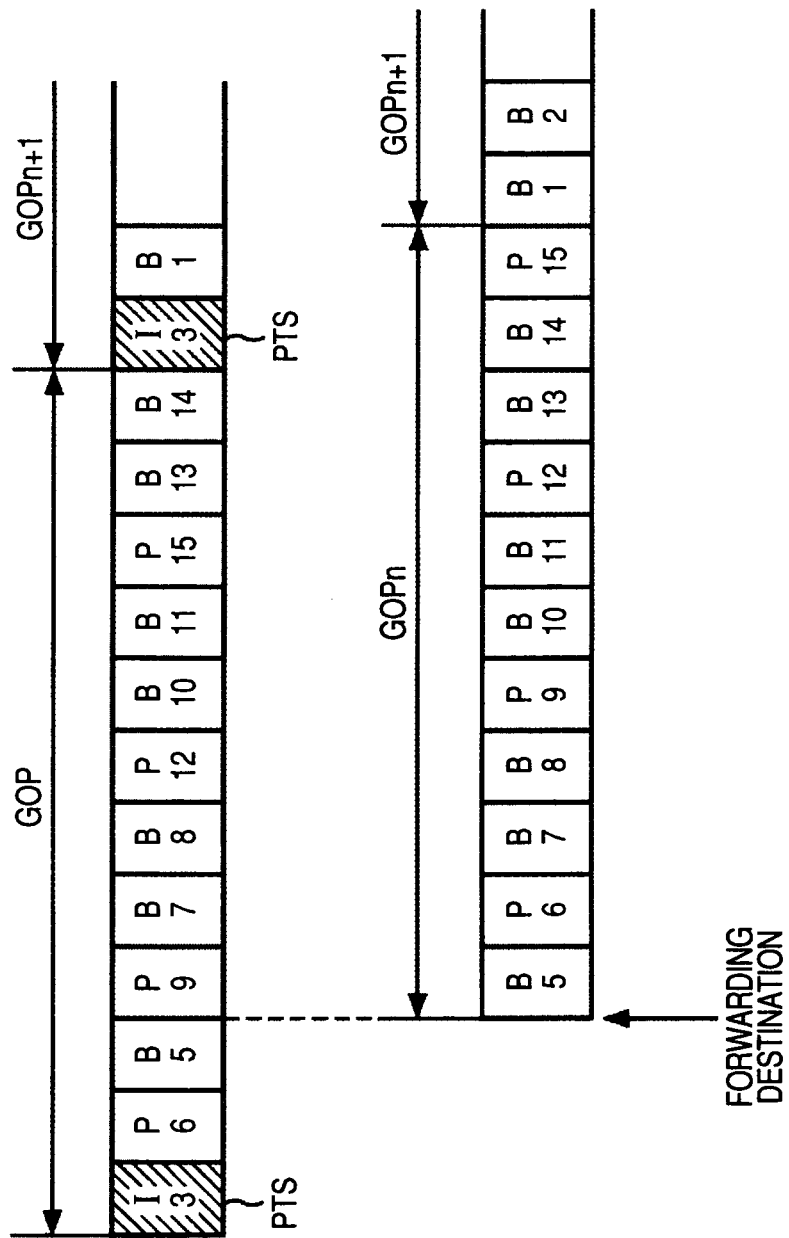
FIG. 1 is a view explaining the order of playing back data encoded in a MPEG system.
Figure 2:
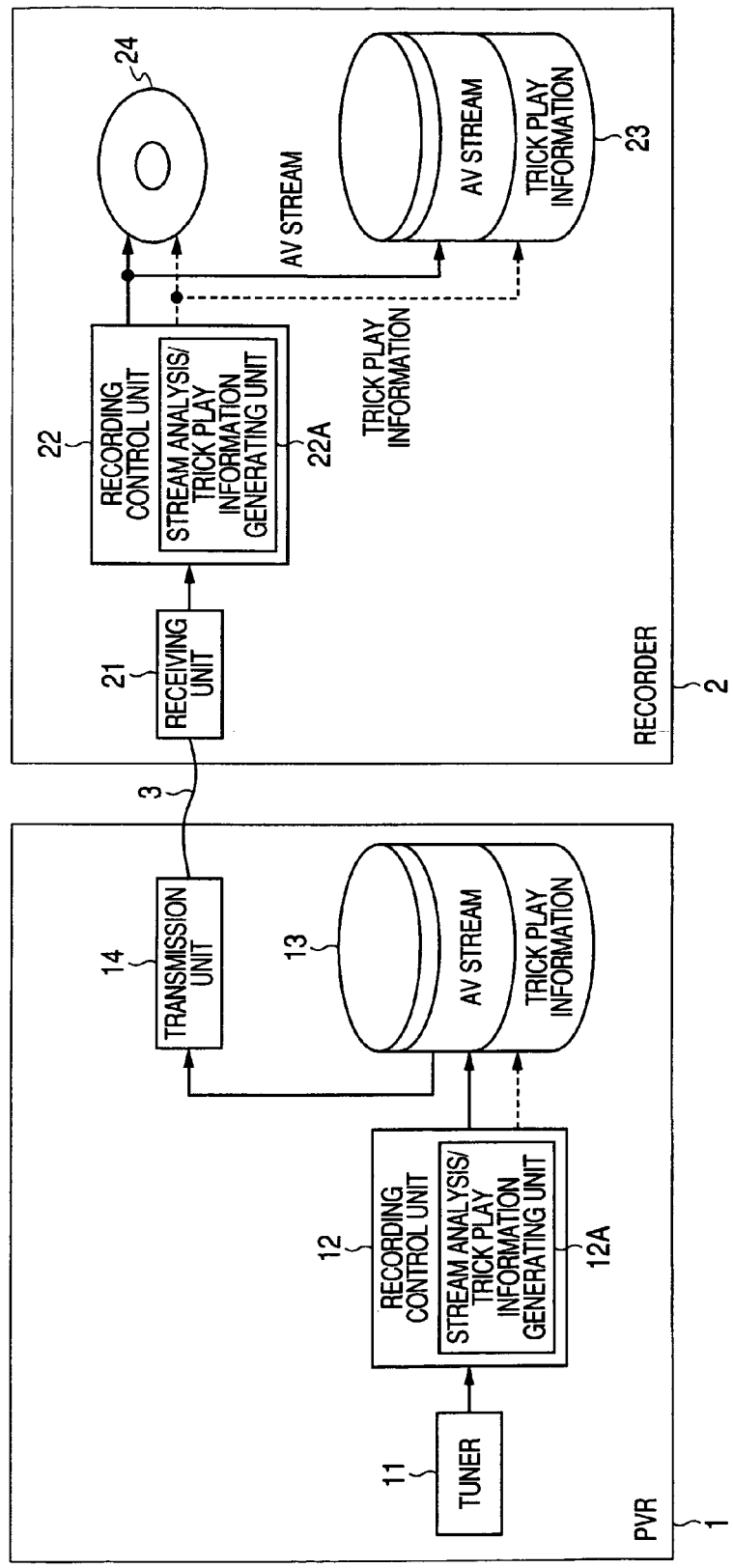
FIG. 2 is a view showing an example of a content transmission system of a related art.

Embodiments of the invention will be explained below, and the correspondence between constituent features of the invention and the embodiments described in the specification or the drawings is exemplified as follows. The description is for confirming that the embodiments supporting the invention are described in the specification or the drawings. Therefore, if there is an embodiment which is described in the specification or the drawings but not described here as the embodiment corresponding to the constituent feature of the invention, that does not mean that the embodiment does not correspond to the constituent feature. On the other hand, even when the embodiment is described here as the embodiment corresponding to the constituent feature, that does not mean that the embodiment does not correspond to constituent features other than the constituent feature.

In a transmission system according to an embodiment of the invention in which a first and second recording apparatus are connected through a network, the first recording apparatus (for example, a PVR 31 of FIG. 3) includes a recording means (for example, a hard disc 43 of FIG. 3) for recording an AV stream, a generating means (for example, a recording control unit 42) for analyzing picture types of respective pictures included in the AV stream and generating trick play information including time information indicating the time of I-pictures on the AV stream which are necessary to be played back before playing back a picture designated as a playback start position by trick play, and a transmission means (for example, a mixing processing unit 44) for transmitting the AV stream recorded in the recording means to the second recording apparatus with the time information included in the trick play information generated by the generating means, and the second recording apparatus (for example, a recorder 32 in FIG. 3) includes a receiving means (for example, a receiving unit 51 in FIG. 3) for receiving the AV stream and the time information transmitted from the first recording apparatus and a recording control means (for example, a recording control unit 52 in FIG. 3) for recording the AV stream received by the receiving means on the predetermined recording medium as well as recording trick play information including recording positions of I-pictures included in the AV stream on the predetermined recording medium and time information indicating the time of respective I-pictures on the AV stream, which is generated based on the time information received by the receiving means.

Hereinafter, embodiments of the invention will be explained with reference to the drawings.

Figure 3:
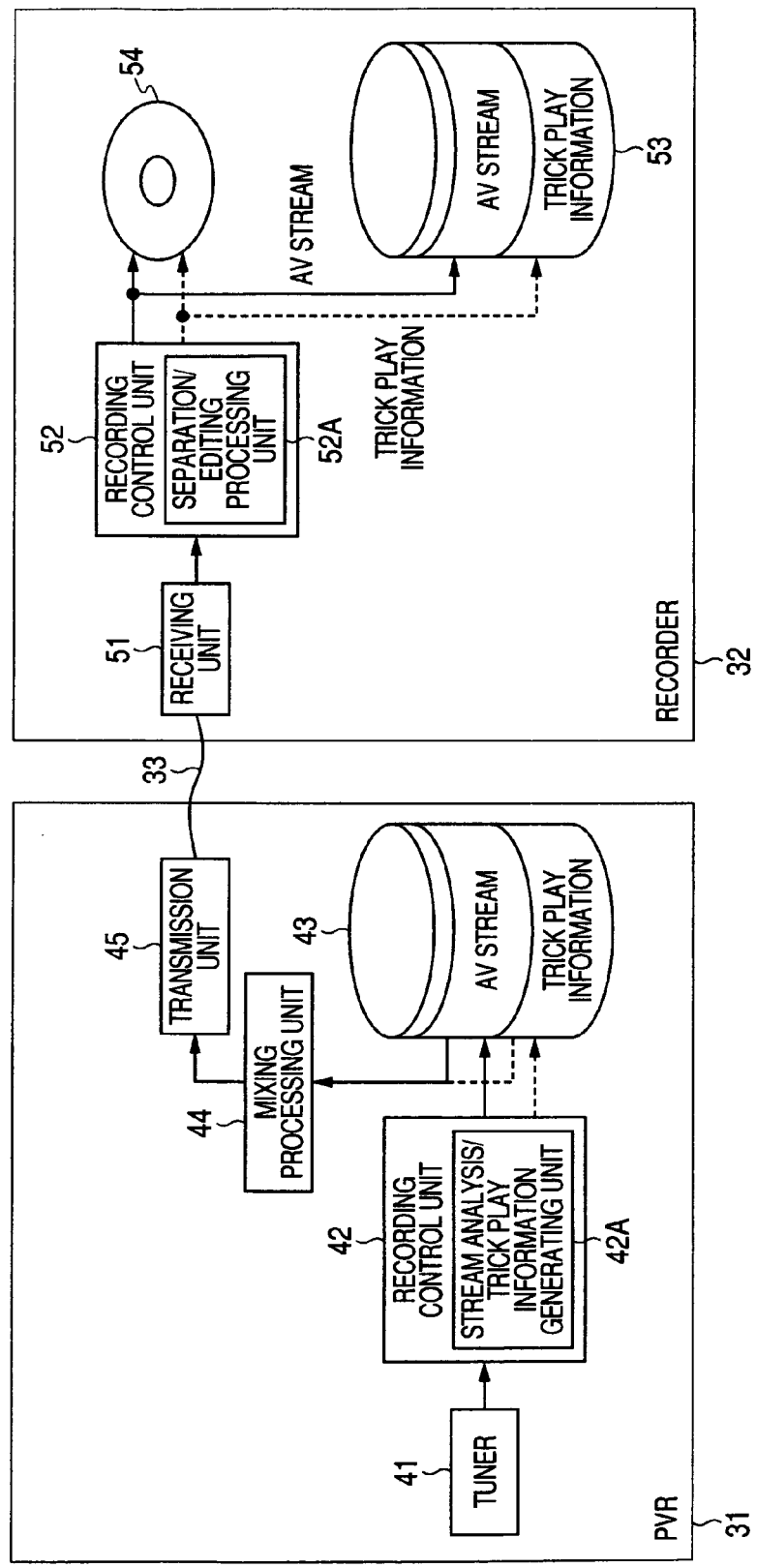
FIG. 3 is a view showing a content transmission system according to an embodiment of the invention.

FIG. 3 is a view showing a content transmission system according to an embodiment of the invention.

The content transmission system of FIG. 3 is configured by a PVR 31 and a recorder 32 being connected through a network 33 which is compliant with a standard such as DLNA or IEEE1394.

The PVR 31 is a STB including a hard disc, provided by a vendor providing contents by CS broadcasting or cable television broadcasting. A recorder 32 is a recording apparatus such as a Blu-Ray recorder including a hard disc, which is purchased by a user at a sales outlet.

As shown in FIG. 3, the PVR 31 includes a tuner 41, a recording control unit 42, a hard disc 43, a mixing processing unit 44 and a transmission unit 45. The recorder 32 includes a receiving unit 51, a recording control unit 52 and a hard disc 53. An optical disc 54 such as a Blu-Ray disc is mounted in the recorder 32.

The tuner 41 of the PVR 31 receives and decodes a broadcast wave signal, acquiring a MPEG-TS. The tuner 41 acquires an AV stream of a content to be recorded from the MPEG-TS, outputting the acquired AV stream to the recording control unit 42.

The recording control unit 42 records the AV stream supplied from the tuner 41 in the hard disc 43. The recording control unit 42 includes a stream analysis/trick play information generating unit 42A, analyzing the AV stream supplied from the tuner 41 to generate trick play information in the stream analysis/trick play information generating unit 42A.

For example, the stream analysis/trick play information generating unit 42A analyzes picture types of respective pictures forming the AV stream to acquire PTSs of I-pictures. The stream analysis/trick play information generating unit 42A generates trick play information by associating the acquired PTS with information indicating a recording position of the I-picture the time of which is shown by the PTS on the hard disc 43, and records the generated trick play information in the hard disc 43.

The hard disc 43 includes an AV stream area in which the AV stream is recorded and a trick play area in which trick play information is recorded. The AV stream in the AV stream area in information supplied from the recording control unit 42 is recorded in the AV stream area and the trick play information is recorded in the trick play information area.

FIG. 4 is a chart showing an example of trick play information.

In the example of FIG. 4, PTS 1 indicating the time of a first I-picture, taking the prescribed time on the AV stream as a standard is associated with the I-picture recording position 1 which is a recording position of the I-picture on the hard disc 43, the time of which is shown by the PTS 1. Also concerning other I-pictures, the PTS indicating the time of the I-picture is associated with the recording position of the I-picture the time of which is shown by the PTS.

For example, when the playback by the trick play is instructed by the user, time and the recording position of an I-picture which is necessary to be played back before playing back a picture according to the position (time) of the picture of the playback start position is certificated based on the trick play information shown in FIG. 4.

Returning to explanation of FIG. 3, when a certain content is instructed to be transmitted by the user, a mixing processing unit 44 reads the AV stream of the content to be transmitted from the hard disc 43 as well as reads PTSs included in the trick play information of the content to be transmitted.

The mixing processing unit 44 stores the AV stream read from the hard disc 43 in plural TS packets and aligns them in the order of transmission as well as inserts the TS packet storing the PTS of the I-picture at the head of a string of TS packets storing data of the I-picture.

The mixing processing unit 44 adds a PID allocated to video data to a packet header of the TS packet storing video data such as the I-picture as well as adds a PID allocated to audio data to the packet header of the TS packet storing audio data.

The mixing processing unit 44 adds a PID which is, for example, allocated to section data including table information to the TS packet storing the PTS of the I-picture, which is different from the PID to be added to the packet header of packets storing the AV stream (video data, audio data). Which kind of data is stored according to each PID is managed also in the recorder 32 which is the apparatus of the transmission destination of the content.

The mixing processing unit 44 outputs a string of TS packets generated as described above to the transmission unit 45. As described later, in the recorder 32 which has received the TS packets transmitted from the PVR 31, when the PTS stored in the TS packet identified by the prescribed PID is acquired, the acquired PTS is recognized as the one showing the PTS of the I-picture transmitted by following the TS packet storing the PTS, and trick play information is generated by using the PTS.

The PTS stored in the TS packet and transmitted from the PVR 31 is used for generating trick play information in the recorder 32, therefore, it is information for generating trick play information (trick-play information generating information). The trick-play information generating information may include information such as the number of the I-picture in addition to the PTS, which is included in the trick play information generated in the PVR 31.

The transmission unit 45 adds a time stamp prescribed by the standard of DLNA to respective TS packets supplied from the mixing processing unit 44 when the network 3 is a network, for example, which is compliant with the standard of DLNA, transmitting them in the order arranged by the mixing processing unit 44 to the recorder 32 through the network 33.

Figure 5:
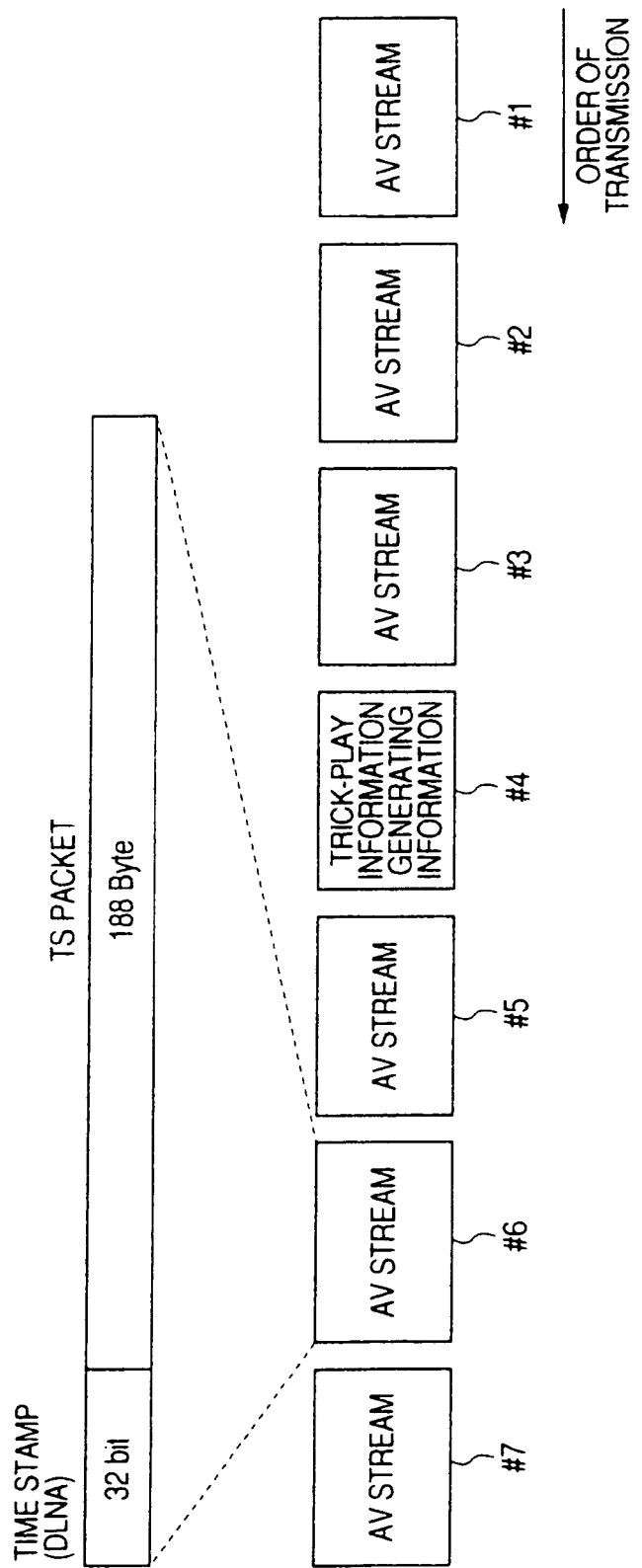
FIG. 5 is a view showing an example of information transmitted from a PVR.

FIG. 5 is a view showing an example of information transmitted from the PVR 31.

FIG. 5 shows transmission information #1 to #7, which is transmitted sequentially from the one shown at the right side. Each transmission information is configured in a form that a time stamp of 32-bit prescribed by the standard of DLNA is added to the TS packet having 188-byte.

In the example of FIG. 5, each of transmission information #1 to #3 includes the TS packet storing the AV stream (video data or audio data) and the time stamp.

The transmission information #4 includes the TS packet storing information for generating trick play information such as the PTS of the I-picture stored in the following transmission information #5 to #7 and the time stamp.

Each of transmission information #5 to #7 includes the TS packet storing the I-picture and the time stamp. Accordingly, the TS packet storing information for generating trick play information is transmitted from the PVR 31 to the recorder 32 before the TS packet storing the I-picture.

Returning to explanation of FIG. 3, the receiving unit 51 of the recorder 32 receives the TS packets transmitted from the PVR 31 in a form that the time stamps prescribed by the standard of DLNA are added, outputting the received TS packets to the recording control unit 52.

The recording control unit 52 controls recording of data with respect to a recording medium designated as a recording destination, which is either the hard disc 53 or the optical disc 54. As shown in FIG. 3, the recording control unit 52 includes a separation/editing processing unit 52A.

The separation/editing processing unit 52A separates the TS packets supplied from the receiving unit 51 based on the PID added to the packet header. The separation/editing processing unit 52A records the AV stream stored in the TS packet in the recording medium designated as the recording destination, which is either the hard disc 53 or the optical disc 54.

The separation/editing processing unit 52A generates trick play information by using information for generating trick play information stored in the TS packet, recording the generated trick play information in the recording medium which is designated as the recording destination. As described later, the generation of trick play information by the separation/editing processing unit 52A is performed without analyzing the AV stream.

The hard disc 53 includes an AV stream area recording the AV stream and a trick play area recording trick play information, recording the AV stream in the AV stream area in information supplied from the recording control unit 52 and recording trick play information in the trick play information area.

Also in the optical disc 54, the AV stream supplied from the recording control unit 52 is recorded in the AV stream area and the trick play information is recorded in the trick play information area.

Figure 6:
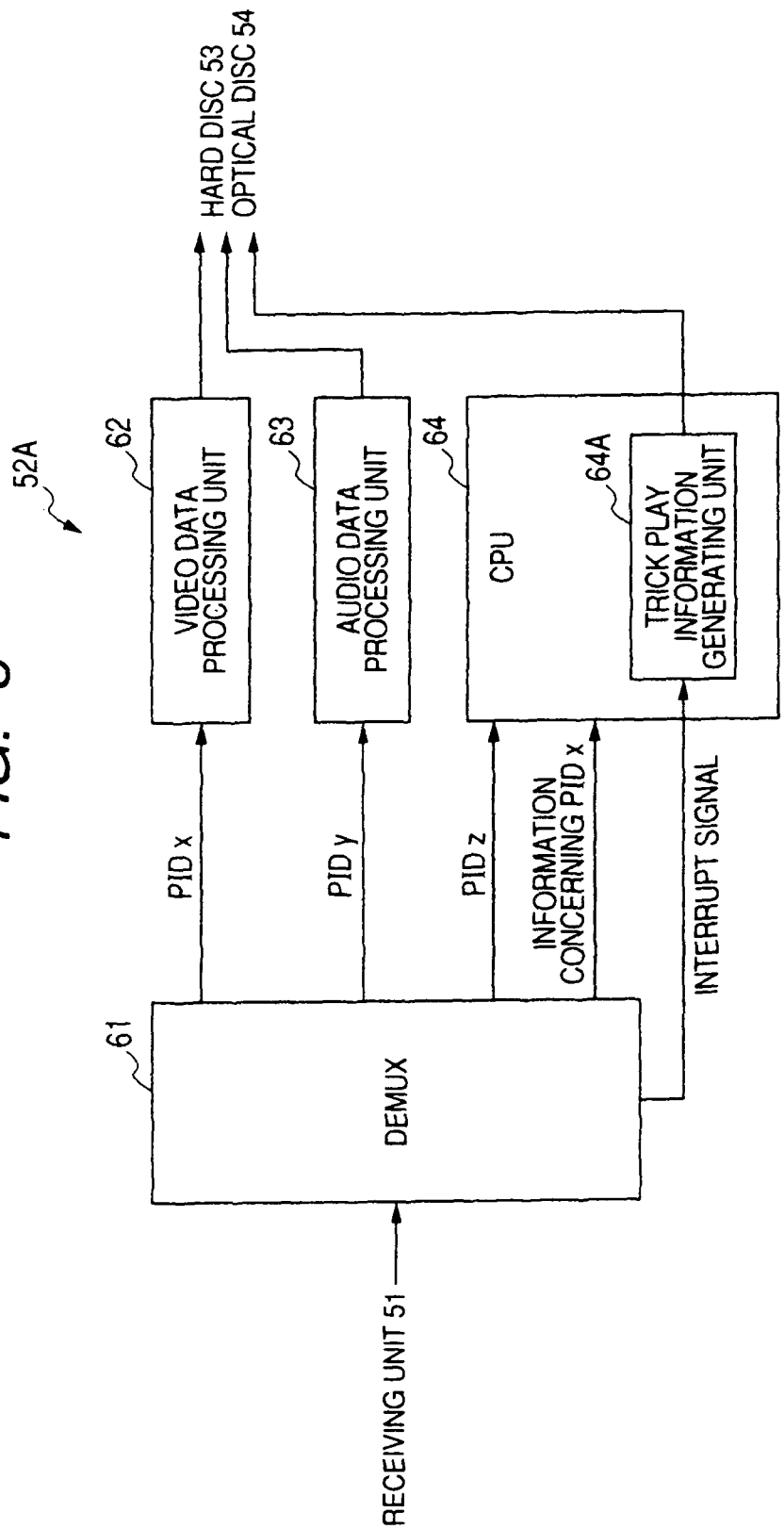
FIG. 6 is a block diagram showing a configuration example of a separation/editing processing unit of FIG. 3.

FIG. 6 is a block diagram showing a configuration example of the separation/editing processing unit 52A of FIG. 3.

As shown in FIG. 6, the separation/editing processing unit 52A includes a DEMUX 61, a video data processing unit 62, an audio data processing unit 63, and a CPU 64 (Central Processing Unit) 64. In the CPU 64, prescribed programs are executed to realize a trick play information generating unit 64A.

The DEMUX 61 separates the TS packets supplied from the receiving unit 51 based on the PID added to the packet header, outputting TS packets in which video data is stored to the video data processing unit 62, outputting TS packets in which audio data is stored to the audio data processing unit 63, and outputting TS packets in which information for generating trick play information included in section information in the PVR 31 and the recorder 32 to the CPU 64, respectively.

In the example of FIG. 6, video data is stored in the TS packet identified by PIDx, and audio data is stored in the TS packet identified by PIDy. The information for generating trick play information is stored in the TS packet identified by PIDZ.

The DEMUX 61 outputs an interrupt signal when the TS packet identified by PIDz is detected, and allowing the generation of trick play information to be performed in precedence with other processing. The interrupt signal is a signal to be outputted from the DEMUX 61 to the CPU 64 when the section information is detected.

Information indicating that the TS packet transmitted following the TS packet in which information for generating trick play information is stored corresponds to which TS packet in TS packets stored in a buffer of the video data processing unit 62 is outputted from the DEMUX 61 to the CPU 64 as information concerning PIDx. The TS packet transmitted following the TS packet identified by PIDZ is the TS packet in which I-picture data is stored, which is outputted from the DEMUX 61 to the video data processing unit 62 and stored in the buffer of the video data processing unit 62.

The video data processing unit 62 temporarily stores the TS packet supplied form the DEMUX 61 in the buffer, generating video data based on data stored in the TS packet. The video data processing unit 62 outputs the generated video data to the recording medium designated as a recording destination, which is either the hard disc 53 or the optical disc 54 to be recorded therein.

The audio data processing unit 63 temporarily stores the TS packet supplied from the DEMUX 61 in the buffer, generating audio data based on data stored in the TS packet. The audio data processing unit 63 outputs the generated audio data to the recording medium designated as a recording destination, which is either the hard disc 53 or the optical disc 54 to be recorded therein.

The CPU 64 controls the video data processing unit 62 and the audio data processing unit 63 to manage the recording of the AV stream.

The trick play information generating unit 64A in the CPU 64 checks that the I-picture the time of which is shown by the PTS included in the information for generating trick play information supplied from the DEMUX 61 is stored in which TS packet in response to the supply of the interrupt signal from the DEMUX 61 by accessing the buffer of the video data processing unit 62.

After the trick play information generating unit 64A checks that the I-picture the time of which is shown by the PTS included in the information for generating trick play information supplied from the DEMUX 61 is stored in which TS packet, the trick play information generating unit 64A controls the video data processing unit 62 to record the I-picture at a prescribed position of the hard disc 53 or the optical disc 54 and acquires information of the recording position.

The trick play information generating unit 64A manages information of the acquired recording position by being associated with the PTS supplied as the information for generating trick play information. When trick play information is generated by associating information of the recording position with the PTS in the same manner with respect to all I-pictures included in the AV stream recorded in the hard disc 53 or the optical disc 54, trick play information generating unit 64A outputs the generated trick play information to the hard disc 53 or the optical disc 54 to be stored with the AV stream.

Accordingly, in the separation/editing processing unit 52A, trick play information is generated without analyzing the AV stream.

The processing of analyzing the AV stream and discriminating the picture type is complicated processing, and assume that the processing is performed, which will be a burden to the CPU 64. However, trick play information can be generated only by associating the PTS included in the information for generating trick play information with the recording position of the I-picture transmitted following the information for generating trick play information, thereby reducing the burden of the CPU 64 and performing generation and recording of the trick play information effectively.

A specific example of processing by the recorder 32 will be explained in reference to FIG. 7 to FIG. 10.

Figure 7:
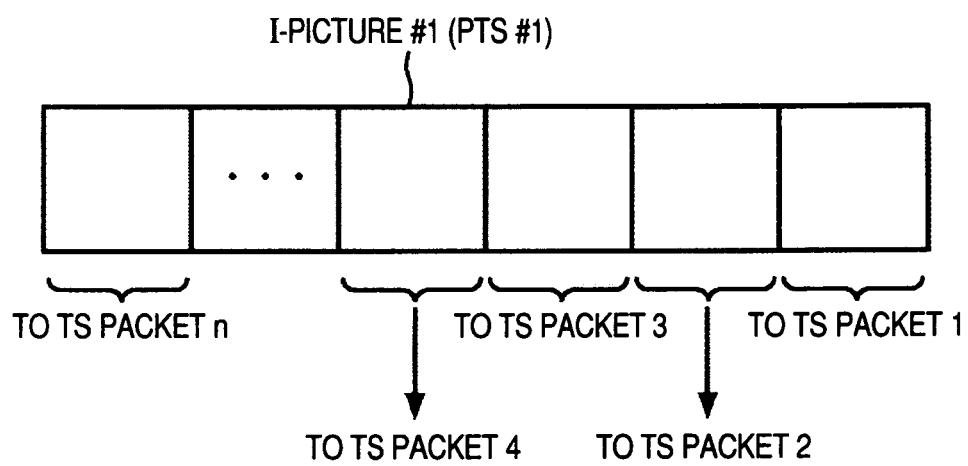
FIG. 7 is a view showing a specific example of processing by a recorder.

FIG. 7 is a view showing an example of separation of data of the I-picture included in the AV stream.

The TS packet is data of 188-byte, it is usually necessary that data of the I-picture in one frame is stored by dividing into plural TS packets to be transmitted. In the PVR 31 which is the apparatus as the transmission source, division as shown in FIG. 7 is performed.

In the example of FIG. 7, a certain amount of data from the head in data forming the I-picture #1 is stored in a TS packet 1, and a certain amount of data following the data stored in the TS packet 1 is stored in a TS packet 2. Similarly, data following the data stored in the TS packet 2 is stored in respective TS packets until a TS packet "n".

Figure 8:
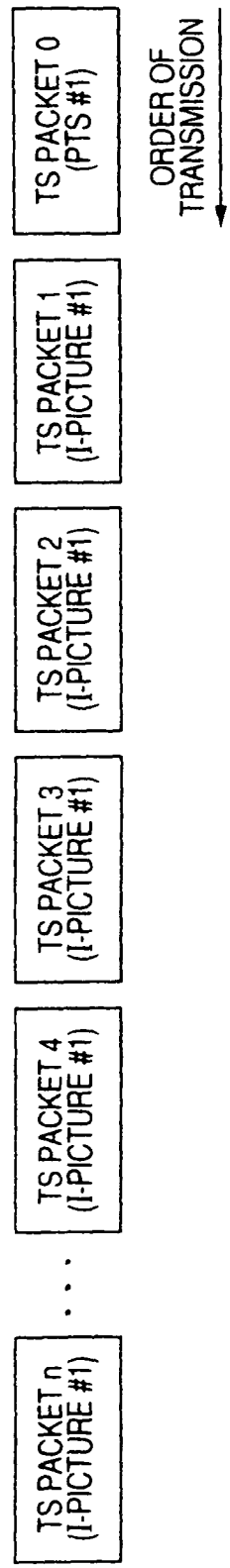
FIG. 8 is another view showing a specific example of processing by a recorder.

Accordingly, when the I-picture of one frame is stored in respective TS packets, transmission is performed in the order from the TS packet 1 to the TS packet "n", and a TS packet "0" in which the PTS #1 as the PTS of the I-picture #1 is stored is inserted at the head of the TS packet 1 to the TS packet "n" as shown in FIG. 8, in which transmission of information concerning the I-picture #1 is performed in the order of the TS packet "0" to the TS packet "n".

Figure 9:
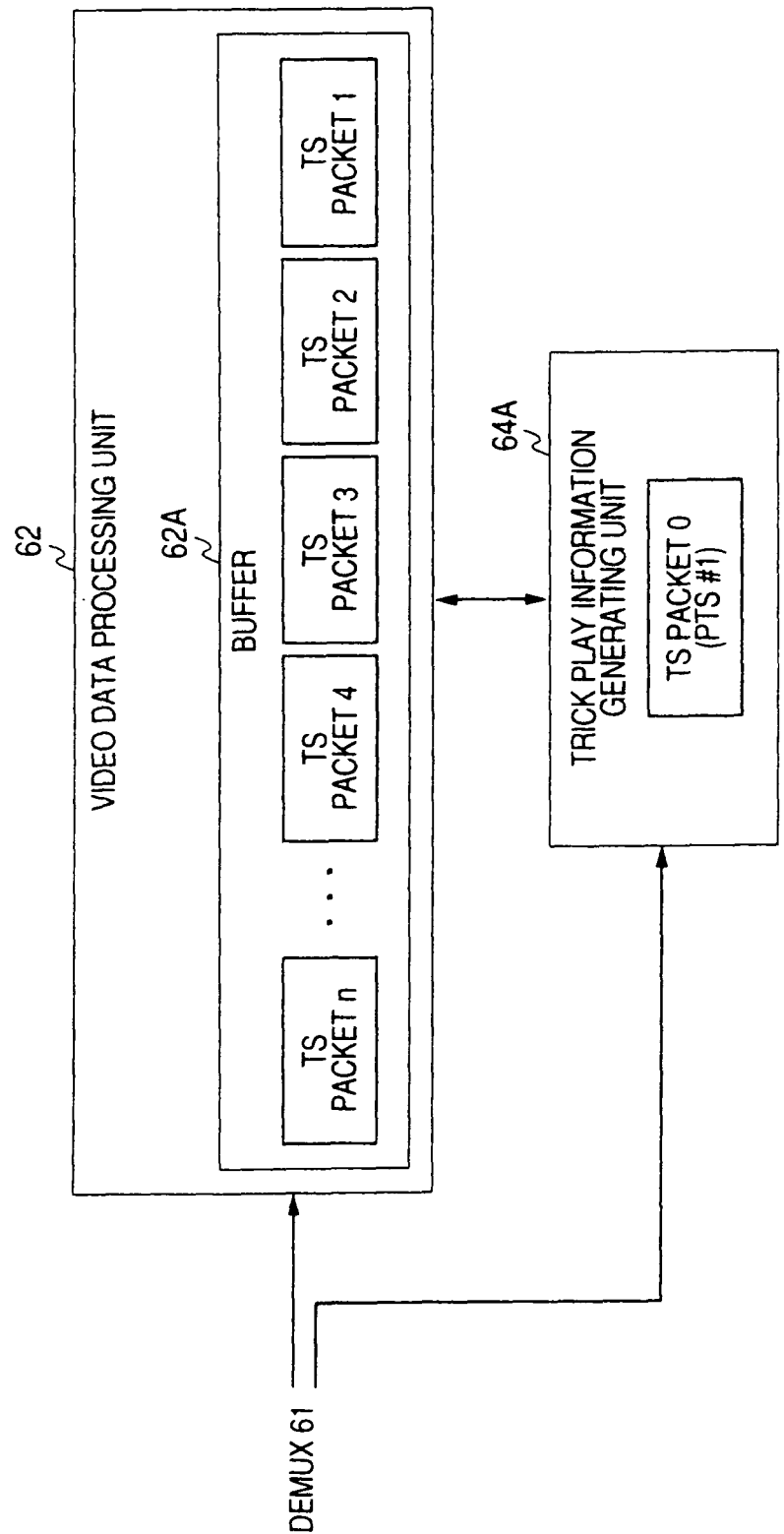
FIG. 9 is further another view showing a specific example of processing by the recorder.

FIG. 9 is a view showing a state of the recorder 32 which has received the TS packets transmitted in the order shown in FIG. 8.

As shown in FIG. 9, the TS packet "0" in the TS packet "0" to "n" transmitted in the order shown in FIG. 8 is outputted to the trick play information generating unit 64A based on the PIDZ. The TS packet 1 to the TS packet "n" transmitted following the TS packet "0" are outputted to the video data processing unit 62 based on the PIDx to be stored in a buffer 62A.

The trick play information generating unit 64A accesses buffer 62A in response to the supply of the interrupt signal from the DEMUX 61, checking that the PTS #1 stored in the TS packet "0" indicates the time of the I-picture #1 stored in the TS packet 1 to the TS packet "n" stored in the buffer 62A (synchronizing the PTS #1 with the I-picture #1).

The trick play information generating unit 64A checks that the PTS #1 indicates the time of the I-picture #1, then, controls the video data processing unit 62 to record the I-picture #1 in a prescribed position of the hard disc 53 or the optical disc 54 to acquire information of the recording position.

The trick play information generating unit 64A manages the information of the recording position and the PTS #1 by being associated with each other. When trick play information is generated by associating information of the recording position and the PTS in the same manner with respect to all I-pictures included in AV stream recorded in the hard disc 53 or the optical disc 54, the trick play information generating unit 64A outputs the generated trick play information to the hard disc 53 or the optical disc 54 and records the information therein with the AV stream.

FIG. 10 is a view showing an example of trick play information generated by the trick play information generating unit 64A.

In the example of FIG. 10, the PTS #1 is associated with the recording position of the I-picture #1. In the trick play information, the PTS is associated with the recording position also with respect to other I-pictures.

Next, processing of the PVR 31 and the recorder 32 having the above configuration will be explained.

Figure 11:
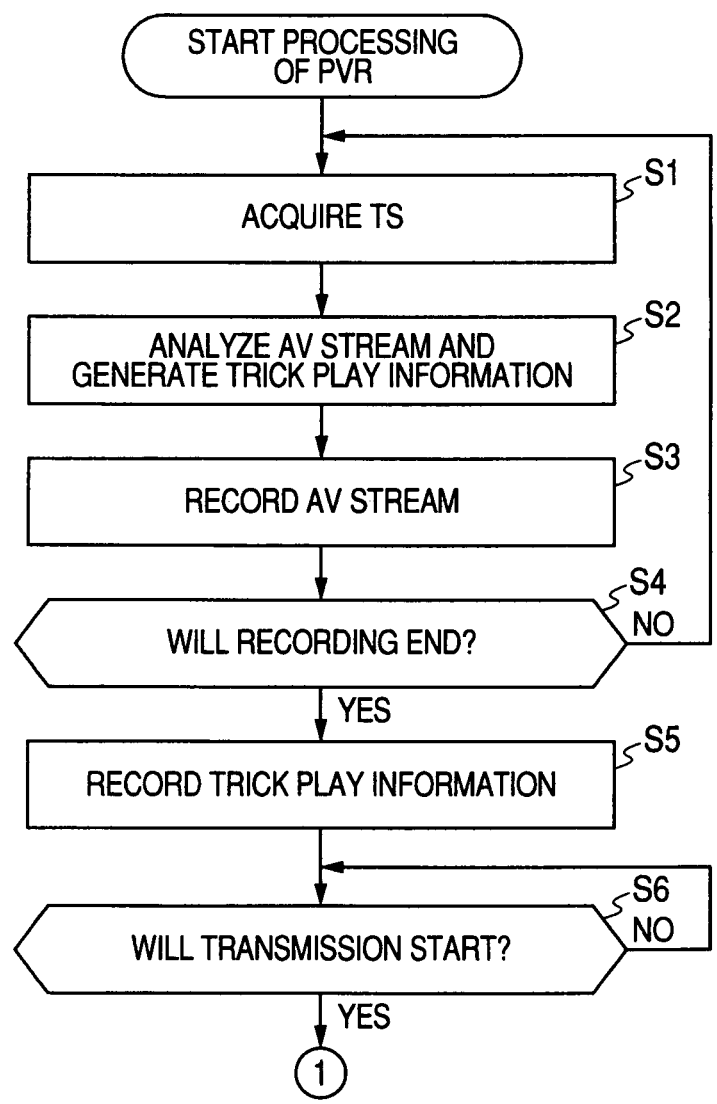
FIG. 11 is a flowchart explaining processing of the PVR.
Figure 12:
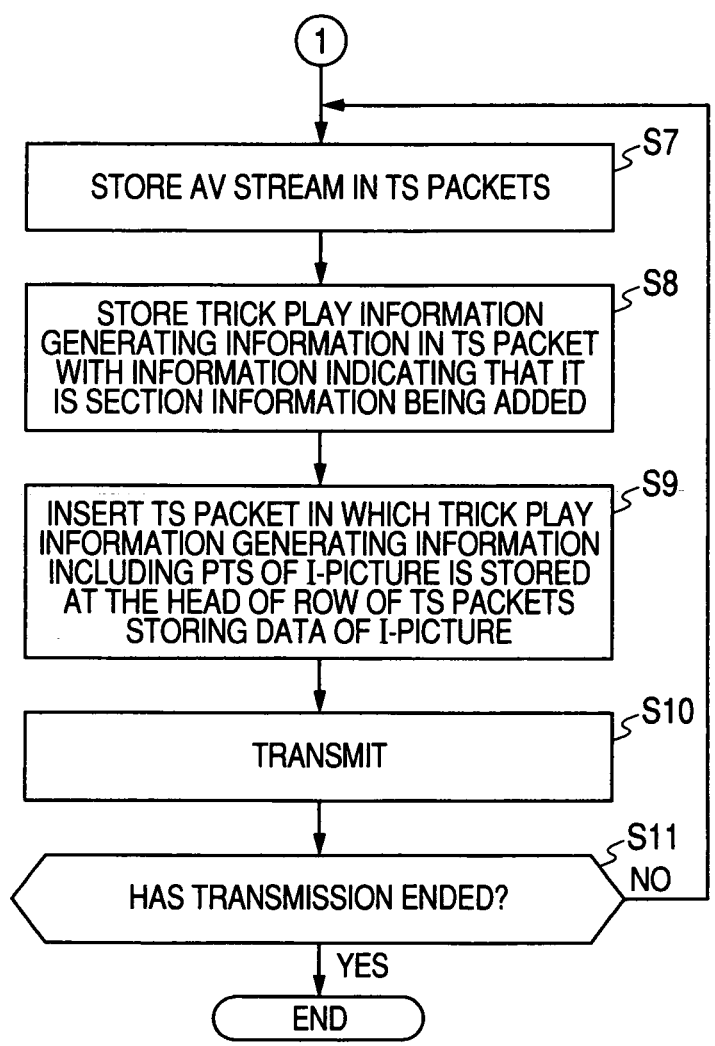
FIG. 12 is a flowchart explaining processing of the PVR which is continued from FIG. 11.

First, processing of the PVR 31 which is the apparatus as the transmission source of contents will be explained with reference to flowcharts of FIG. 11 and FIG. 12.

In Step S1, the tuner 41 receives and decodes a broadcasting wave signal to acquire a MPEG-TS. The tuner 41 acquires an AV stream of a content to be recorded from the MPEG-TS, outputting the acquired AV stream to the recording control unit 42.

In Step S2, the stream analysis/trick play information generating unit 42A in the recording control unit 42 analyzes the AV stream supplied from the tuner 41 to acquire PTSs of I-pictures, generating trick play information by associating the acquired PTS with information indicating the recording position of the I-picture the time of which is shown by the PTS.

In Step S3, the recording control unit 42 records the AV stream supplied from the tuner 41 in the hard disc 43.

In Step S4, the recording control unit 42 determines whether the recording of the AV stream will end or not, and when the recording control unit 42 determines that the recording will not end because the whole AV stream of the content to be recorded is not recorded, the process returns to Step S1 and subsequent processing will be repeated.

When it is determined that the recording of the AV stream will end in Step S4, the recording control unit 42 records the generated trick play information in the hard disc 43 in Step S5.

In Step S6, the mixing processing unit 44 determines whether the transmission of the content recorded in the hard disc 43 will start or not, and waits until it is determined that the transmission will start.

When it is determined that the transmission of the content starts based on the instruction by the user in Step S6, the mixing processing unit 44 reads the AV stream of the content to be transmitted from the hard disc 43 and stored the read AV stream in plural TS packets in Step S7.

In Step S8, the mixing processing unit 44 reads PTSs included in the trick play information of the content to be transmitted and stores the read PTSs in TS packets as information for generating trick play information. The PID indicating the section information is added to the TS packet in which the information for generating trick play information is stored.

In Step S9, the mixing processing unit 44 aligns TS packets in which the AV stream is stored in the order of transmission, inserting the TS packet in which information for generating trick play information including the PTS of the I-picture is stored at the head of the string of the TS packets storing data of the I-picture.

In Step S10, the transmission unit 45 transmits TS packets aligned by the mixing processing unit 44 to the recorder 32 in order with a time code prescribed by the standard of DLNA being added.

In Step S11, the transmission unit 45 determines whether the whole AV stream of the content to be transmitted has been transmitted or not, and when it is determined that the transmission has not ended, the process returns to Step S7, and subsequent processing will be repeated.

In Step S11, when it is determined that the whole AV stream of the content to be transmitted has been transmitted, the processing ends.

Next, processing of a recorder 32 which is the apparatus as the transmission destination of contents will be explained with reference to a flowchart of FIG. 13. The processing starts when TS packets storing the AV stream and the like are transmitted from the PVR 31.

In Step S21, the receiving unit 51 receives TS packets transmitted from the PVR 31 and outputs the received TS packets to the recording control unit 52.

In Step S22, the DEMUX 61 of the recording control unit 52 separates TS packets supplied from the receiving unit 51 based on the PID added to the packet header, outputting TS packets in which video data is stored to the video data processing unit 62, outputting TS packets in which audio data is stored to the audio data processing unit 63, and outputting TS packets in which information for generating trick play information is stored to the CPU 64, respectively. The interrupt signal is also outputted from the DEMUX 61 to the trick play information generating unit 64A.

In Step S23, the video data processing unit 62 stores the TS packets supplied from the DEMUX 61 in the buffer temporarily, generating video data based on data stored in the TS packets. The audio data processing unit 63 stores the TS packets supplied from the DEMUX 61 in the buffer temporarily, generating audio data based on data stored in the TS packets.

In Step S24, the trick play information generating unit 64A checks that the I-picture the time of which is shown by the PTS included in the information for generating trick play information is stored in which TS packet in response to the supply of the interrupt signal from the DEMUX 61, controlling the video data processing unit 62 to record the I-picture in the prescribed position of the hard disc 53 or the optical disc 54. The trick play information generating unit 64A acquires information of the recording position of the I-picture, generating trick play information by associating acquired information of the recording position with the PTS supplied as information for generating trick play information.

In Step S25, the video data processing unit 62 outputs the generated video data to the recording medium designated as the recording destination, which is either the hard disc 53 or the optical disc 54, and records the data therein. The audio data processing unit 63 outputs the generated audio data to the recording medium designated as the recording destination, which is either the hard disc 53 or the optical disc 54, and records the data therein.

In Step S26, the trick play information generating unit 62A determines whether the whole AV stream has been recorded or not, and when it is determined that it has not been recorded, the process returns to Step S21, and subsequent processing is repeated.

On the other hand, when it is determined in Step S26 that the whole AV stream has been recorded, in Step S27 the trick play information generating unit 64A outputs the trick play information to the hard disc 53 or the optical disc 54 to record the information with the AV stream. In the trick play information recorded here, information of recording positions of all I-pictures included in the AV stream recorded in the hard disc 53 or the optical disc 54 is associated with the PTSs. When the trick play information is recorded, the processing ends.

According to the above processing, the burden of the recorder 32 which is the apparatus as the transmission destination of contents can be reduced, which realizes effective transmission processing. It is not necessary to prepare a sufficiently high-performance chip to a degree that the analysis of the stream can be performed in the recorder 32, which can reduce manufacturing costs of the recorder 32.

In the above description, the TS packet in which information for generating trick play information is discriminated from other TS packets by the PID, however, it is also preferable that the TS packet is discriminated by other information.

For example, time stamps along the time series in the order of transmission are added to respective TS packets storing the AV stream, however, it is also preferable that the TS packet to which the time stamp which is not along the time series is added is inserted just before the string of the TS packets storing data of I-picture, and the TS packet in which information for generating trick play information is stored is discriminated by the time stamp not along the time series.

In the recorder 32, when the TS packet to which the time stamp not along the time series is added is detected, the TS packet is recognized as the packet in which information for generating trick play information is stored, and the PTS stored as the information for generating trick play information is recognized as the PTS showing the time of the I-picture stored in the TS packet following next, which is used for generating trick play information.

In the above description, the TS packet in which the PTS is stored is transmitted by being inserted at the head of the string of the TS packets storing data of the I-picture, it is also preferable that the TS packet is transmitted by being inserted at the end position of the string of the TS packets storing data of the I-picture when the recorder 32 which is the apparatus as the transmission destination of contents can descriminate the position, and it is also preferable that the packet is transmitted by being inserted at the middle position of the string of the TS packets storing data of the I-picture.

The case in which contents are transmitted in accordance with the standard of DLNA has been explained as the above, however, it is also preferable that the transmission of contents can be performed in accordance with other standards. When the transmission of contents is performed in accordance with the other standards, the time stamp of 32-bit as shown in FIG. 5 is not added to the TS packet to be transmitted.

The above series of processing can be executed by hardware as well as by software. When the series of processing is performed by software, it is installed in a computer in which programs included in the software are incorporated in dedicated-hardware or a general-purpose personal computer which can execute various functions by installing various programs.

The executing programs to be installed are provided by, for example, being recorded in the optical disc 54 shown in FIG. 3 which is a packaged medium, or through wired or wireless transmission media such as a local area network, Internet, or digital satellite broadcasting. The programs can be previously installed in the hard disc 53.

The programs executed by the computer may be programs in which processing is performed in time series along the order of explanation in the specification, as well as programs in which processing is performed in parallel or at the necessary timing such as the case when calling is made.

The embodiment of the invention is not limited to the above embodiment and can be variously changed within a scope not departing from the gist of the invention.

What is claimed is:

1. A transmission system comprising:
a first recording apparatus and a second recording apparatus connected to each other through a network,
wherein the first recording apparatus includes:
a recording means for recording an AV stream,
a generating means for analyzing picture types of respective pictures included in the AV stream and generating trick play information including time information indicating the time of I-pictures on the AV stream which are necessary to be played back before playing back a picture designated as a playback start position by trick play, and
a transmission means for transmitting the AV stream recorded in the recording means to the second recording apparatus with the time information included in the trick play information generated by the generating means; and
wherein the second recording apparatus includes:
a receiving means for receiving the AV stream and the time information transmitted from the first recording apparatus, and
a recording control means for recording the AV stream received by the receiving means on a predetermined recording medium as well as recording trick play information including recording positions of I-pictures included in the AV stream on the predetermined recording medium and time information indicating the time of respective I-pictures on the AV stream, which is generated based on the time information received by the receiving means, on the predetermined recording medium,
in which the generating means of the first recording apparatus analyzes the picture types of respective pictures included in the AV stream to acquire presentation time stamp (PTS) information of the I-pictures in generating the trick play information and the recording control means of the second recording apparatus checks that a respective time for each respective I-picture is available from the PTS information from the first recording apparatus and generates the trick play information therefrom without analyzing the picture types of respective pictures included in the AV stream.

2. A recording apparatus connectable through a network to another apparatus analyzing picture types of respective pictures included in an AV stream, generating trick play information including time information indicating the time of I-pictures on the AV stream which are necessary to be played back before playing back a picture designated as a playback start position by trick play, and transmitting the recorded AV stream with the time information included in the trick play information, comprising:
a receiving means for receiving the AV stream and the time information transmitted from another apparatus; and
a recording control means for recording the AV stream received by the receiving means on a predetermined recording medium as well as recording trick play information including recording positions of I-pictures included in the AV stream on the predetermined recording medium and time information indicating the time of respective I-pictures on the AV stream, which is generated based on the time information received by the receiving means, on the predetermined recording medium,
in which the another apparatus analyzes the picture types of respective pictures included in the AV stream to acquire presentation time stamp (PTS) information of the I-pictures in generating the trick play information and the recording control means of the recording apparatus checks that a respective time for each respective I-picture is available from the PTS information from the another apparatus and generates the trick play information therefrom without analyzing the picture types of respective pictures included in the AV stream.

3. The recording apparatus according claim 2,
wherein, when a second packet storing the time information is inserted at just before a string of first packets storing data of the I-picture included in the AV stream, and the string of first packets is transmitted after the second packet is transmitted, the recording control means generates trick play information by associating the time information stored in the second packet with a recording position of the I-picture on the predetermined recording medium, whose data is stored in the string of first packets transmitted just after the second packet.

4. A recording method of a recording apparatus which is connectable through a network to another apparatus analyzing picture types of respective pictures included in an AV stream and generating trick play information including time information indicating the time of I-pictures on the AV stream which are necessary to be played back before playing back a picture designated as a playback start position by trick play, and transmitting the recorded AV stream with the time information included in the generated trick play information, comprising the steps of:
receiving the AV stream and the time information transmitted from another recording apparatus; and
recording the received AV stream on a predetermined recording medium as well as recording trick play information including recording positions of I-pictures included in the AV stream on the predetermined recording medium and time information indicating the time of respective I-pictures on the AV stream, which is generated based on the received time information, on the predetermined recording medium, in which the another apparatus analyzes the picture types of respective pictures included in the AV stream to acquire presentation time stamp (PTS) information of the I-pictures in generating the trick play information and the recording of the recording apparatus includes checking that a respective time for each respective I-picture is available from the PTS information from the another apparatus and generating the trick play information therefrom without analyzing the picture types of respective pictures included in the AV stream.

5. A non-transitory computer readable recording medium having stored thereon a program allowing a computer to execute a recording processing of a recording apparatus which is connected through a network to another apparatus analyzing picture types of respective pictures included in an AV stream and generating trick play information including time information indicating the time of I-pictures on the AV stream which are necessary to be played back before playing back a picture designated as a playback start position by trick play, and transmitting the recorded AV stream with the time information included in the generated trick play information, comprising the steps of:

receiving the AV stream and the time information transmitted from another recording apparatus; and recording the received AV stream on a predetermined recording medium as well as recording trick play information including recording positions of I-pictures included in the AV stream on the predetermined recording medium and time information indicating the time of respective I-pictures on the AV stream, which is generated based on the received time information, on the predetermined recording medium, in which the another apparatus analyzes the picture types of respective pictures included in the AV stream to acquire presentation time stamp (PTS) information of the I-pictures in generating the trick play information and the recording of the recording apparatus includes checking that a respective time for each respective I-picture is available from the PTS information from the another apparatus and generating the trick play information therefrom without analyzing the picture types of respective pictures included in the AV stream.

6. A transmission system comprising:

a first recording apparatus and a second recording apparatus connected to each other through a network, wherein the first recording apparatus includes:

a recording unit configured to record an AV stream, a generating unit configured to analyze picture types of respective pictures included in the AV stream and to generate trick play information including time information indicating the time of I-pictures on the AV stream which are necessary to be played back before playing back a picture designated as a playback start position by trick play, and a transmission unit configured to transmit the AV stream recorded in the recording unit to the second recording apparatus with the time information included in the trick play information generated by the generating unit; and wherein the second recording apparatus includes:

a receiving unit configured to receive the AV stream and the time information transmitted from the first recording apparatus, and a recording control unit configured to record the AV stream received by the receiving unit on a predetermined recording medium as well as to record trick play information including recording positions of I-pictures included in the AV stream on the predetermined recording medium and time information indicating the time of respective I-pictures on the AV stream, which is generated based on the time information received by the receiving unit, on the predetermined recording medium, in which the generating unit of the first recording apparatus analyzes the picture types of respective pictures included in the AV stream to acquire presentation time stamp (PTS) information of the I-pictures in generating the trick play information and the recording control unit of the second recording apparatus checks that a respective time for each respective I-picture is available from the PTS information from the first recording apparatus and generates the trick play information therefrom without analyzing the picture types of respective pictures included in the AV stream.

7. A recording apparatus connectable through a network to another apparatus analyzing picture types of respective pictures included in an AV stream, generating trick play information including time information indicating the time of I-pictures on the AV stream which are necessary to be played back before playing back a picture designated as a playback start position by trick play, and transmitting the recorded AV stream with the time information included in the trick play information, comprising:

a receiving unit configured to receive the AV stream and the time information transmitted from another apparatus; and a recording control unit configured to record the AV stream received by the receiving unit on a predetermined recording medium as well as recording trick play information including recording positions of I-pictures included in the AV stream on the predetermined recording medium and time information indicating the time of respective I-pictures on the AV stream, which is generated based on the time information received by the receiving unit, on the predetermined recording medium, in which the another apparatus analyzes the picture types of respective pictures included in the AV stream to acquire presentation time stamp (PTS) information of the I-pictures in generating the trick play information and the recording control unit of the recording apparatus checks that a respective time for each respective I-picture is available from the PTS information from the another apparatus and generates the trick play information therefrom without analyzing the picture types of respective pictures included in the AV stream.

* * * * *